April 12, 1932.  A. T. DUDLEY  1,853,263
AUTOMATIC REGULATOR APPARATUS
Filed Feb. 9, 1929   3 Sheets-Sheet 1
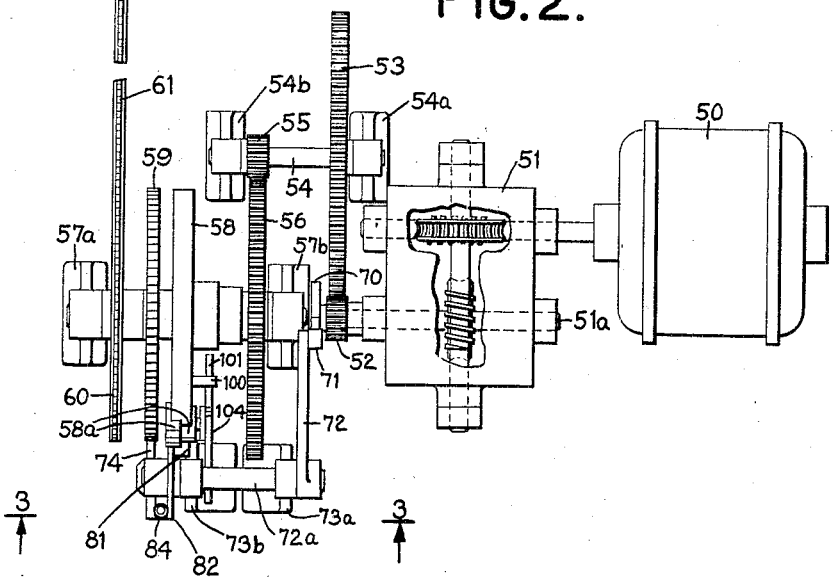
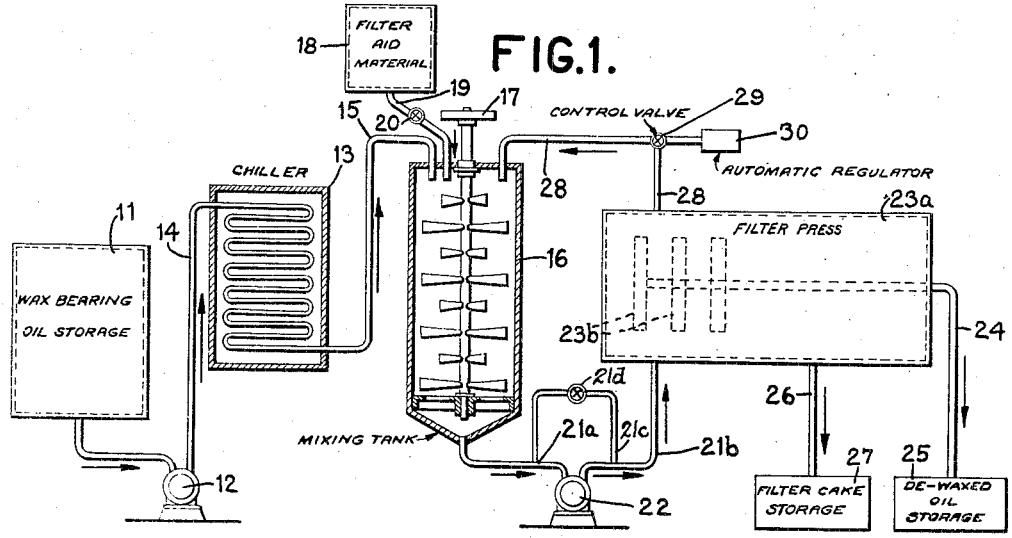
Inventor
Andrew T. Dudley
By his Attorney
R. J. Dearborn April 12, 1932.  A. T. DUDLEY  1,853,263
AUTOMATIC REGULATOR APPARATUS
Filed Feb. 9, 1929  3 Sheets-Sheet 2
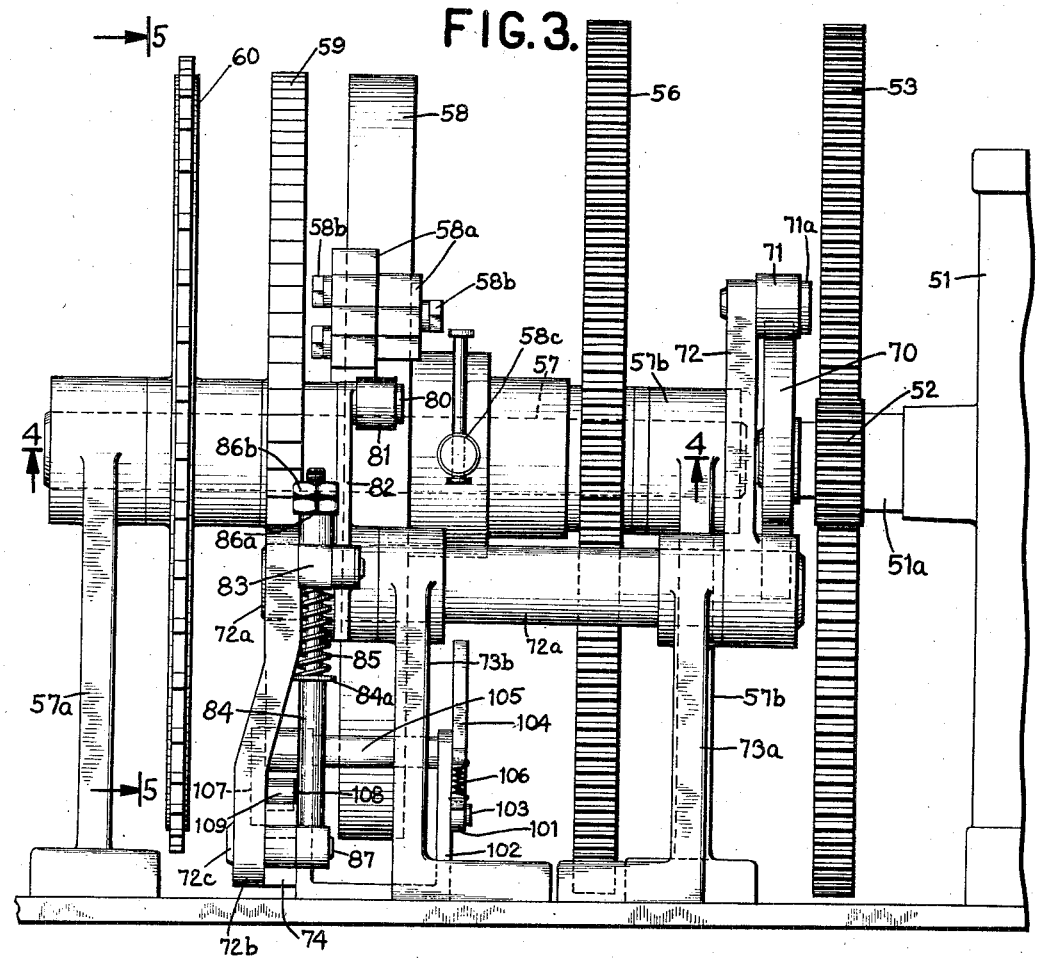

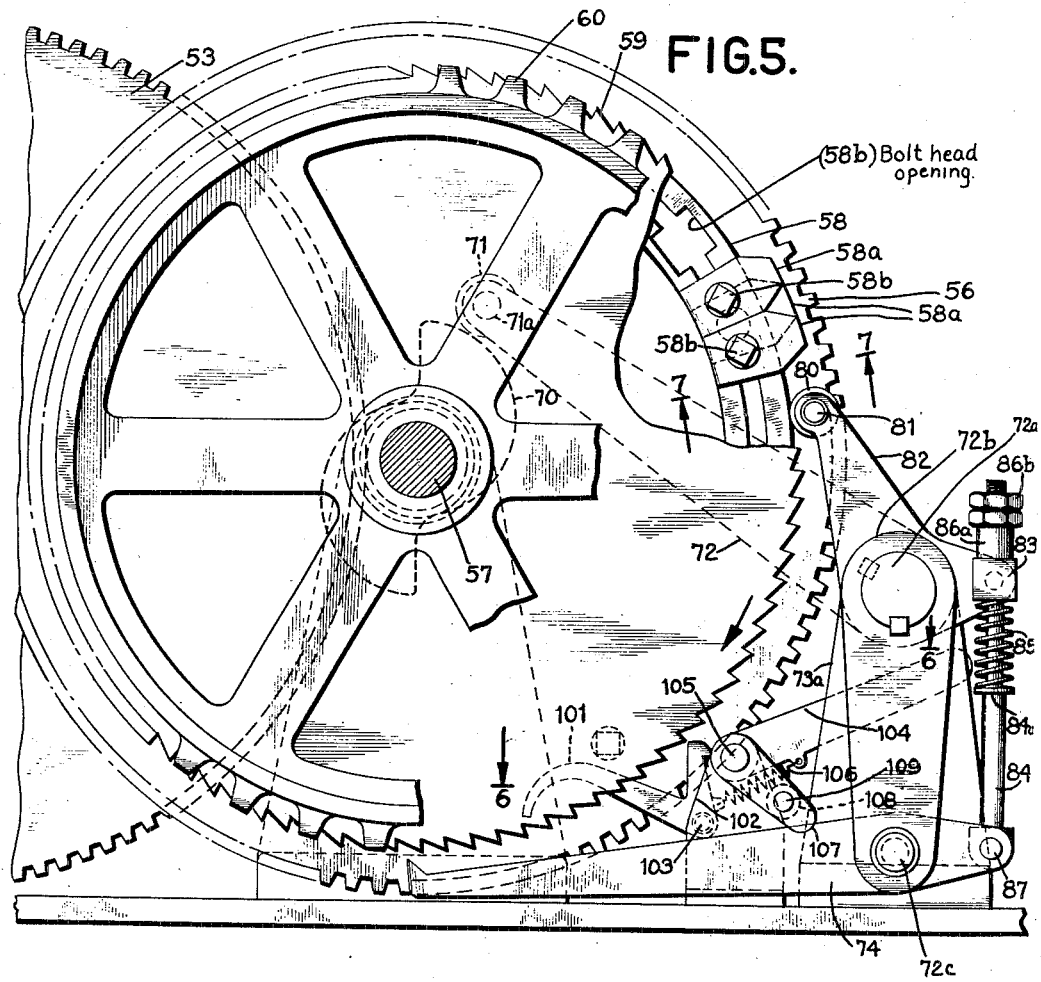
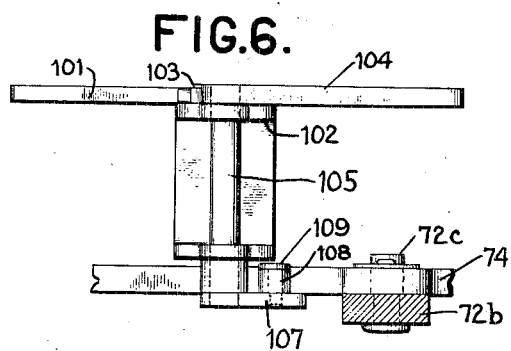
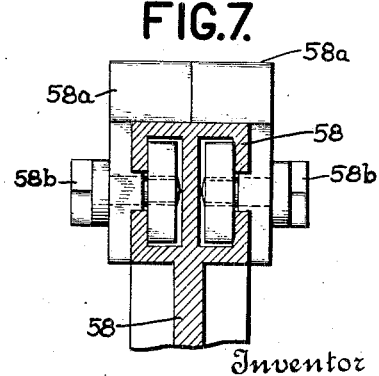

Patented Apr. 12, 1932

1,853,263

UNITED STATES PATENT OFFICE

ANDREW T. DUDLEY, OF PORT ARTHUR, TEXAS, ASSIGNOR TO THE TEXAS COMPANY, OF NEW YORK, N. Y., A CORPORATION OF DELAWARE

AUTOMATIC REGULATOR APPARATUS

Application filed February 9, 1929. Serial No. 338,640.

The invention relates to a mechanical device to operate in conjunction with a system for continuously treating a fluid over a space of time, to which the fluid is delivered in a substantially constant stream and from which a portion of the fluid is regulatably discharged while another portion of the fluid is regulatably circulated within the system and relates more specifically to an apparatus which operates over a predetermined space of time to regulate a valve in combination therewith, by opening or closing the valve, after which the apparatus automatically ceases to function with relation to the valve. The apparatus permits of adjustment as to the length of duration of the operating time so as to vary the duration of the operating time to suit the condition to which it is adapted.

It is particularly useful in connection with a system for treating liquids. For example in a treating system consisting in part of a mixing chamber, a filter chamber containing filter elements, interposed pipe lines and a pump adapted to carry out certain steps in a contact filtering or dewaxing treatment of petroleum oils and admixed clay, diatomaceous earth or filter-aid or the like where the mixture of oil and material is delivered from the mixing chamber to the filter chamber in a substantially constant stream and a portion of the mixture is recirculated in order to maintain a turbulent or agitated body of mixture in the filtering chamber while a portion of the liquid is filtered and discharged from the system and where the duration of the operating time of the system during one cycle when treating a given oil is known.

The term cycle is used here in the ordinary sense and for this sort of operation a cycle begins when the clean equipment starts a run and ends when the equipment normally becomes clogged with the material collecting on the surfaces of the filters to such an extent that the operating pressure will be excessive or the rate of filtration too low for economic operation. When this condition obtains it is necessary to stop the operation, thus ending a cycle, and clean out the filter after which another cycle may be begun.

It is ordinarily of advantage to operate the filter apparatus under a superatmospheric pressure rather than a subatmospheric pressure in forcing the oil through the filter elements against a normally increasing amount of resistance due to the gradually collecting cake of material on the filter surfaces and for the best all around operating condition it has been found that a pressure of from 0# to approximately 250# is the most advantageous. That is to say, that the operation may start a little or no pressure and as the cake builds up on the filter surfaces the pressure is correspondingly increased until a pressure of about 250# is reached when the operation is stopped. The maximum pressure may of course be varied according to the equipment employed, and it is to be understood that oils of different natures may be filtered, or the temperature employed in the operation may be varied or the amount of admixed solid material may be varied and accordingly these factors based on past experience are used in reckoning the length or duration of a cycle.

Thus with certain equipment operating under a given range of pressure, filtering a given oil, containing a given amount of material to be filtered out at a given temperature the time length of a cycle can be calculated very accurately.

It is also of advantage to keep the body of the mixture of oil and solid material maintained in the filter chamber agitated or in a turbulent condition so as to keep the material suspended and about equally distributed throughout the oil. In filters of the type usually employed in an operation as briefly described above the oil passes through the filter elements so slowly that it is necessary to continuously circulate an additional quantity of the mixture through the filter chamber in order to keep the body of mixture contained therein properly agitated and accordingly a return line is provided from the filter chamber to the mixing chamber in the system merely for the purpose of returning a portion of the mixture from the filter chamber to the mixing chamber wherein a desirable reservoir of the mixture is maintained.

Such a line, without proper restriction, might permit an accelerated flow of the mixture therethru, as a collection or cake of material gathers and grows on the surfaces of the filter elements and offers increasing resistance to the flow of oil therethrough, at the expense of the rate of passage of filtrate thru the filter elements when pumping mixture of oil and material into the filter chamber at a constant rate. Accordingly a valve is provided in this return line which is gradually restricted or closed by the controlling timed mechanism over a predetermined space of time, or in other words during the cycle, and at the end of the cycle the timed mechanism, having closed the valve automatically ceased to function with relation to the valve.

Thus it is to be seen that as resistance to flow of the filtrate through the filter elements is increased due to the increasing amount of material lodged on their surfaces, the timed mechanism is gradually and correspondingly increasing the amount of resistance against return of a portion of the mixture of oil and material to the mixing reservoir by gradually restricting or closing the valve. Also a pressure is gradually built up in the filter chamber by force of the pump which delivers a substantially constant stream of the mixture to the filter chamber a portion of the oil of which is forced through the filter elements and discharged from the system while a portion of the mixture is returned from the filter chamber to the mixing reservoir until the pressure reaches say 250# per square inch. At this stage the valve in the return line is closed and the controlling mechanism automatically ceases to function with relation to the valve. A relief valve set to relieve at say 260# per square inch is preferably provided together with a line connecting the pumps discharge to its suction to by-pass the stream of mixture discharged from the pump until the pump can be stopped. In some cases it may be preferable to provide a diaphragm or the like connected to the discharge line from the pump to operate means at the end of the cycle, such as an electric switch or a valve in a steam supply line, for stopping the pump.

A better understanding of the apparatus and its various advantages and objects may be had by referring to the following detailed description and accompanying drawings of a preferred embodiment of the invention, in which:

Fig. 1 is a diagrammatic illustration of a complete treating system including the invention.

Fig. 2 is a view in plan of the invention.

Fig. 3 is a view taken on the line "3—3" of Fig. 2.

Fig. 4 is a fragmentary view taken on the line "4—4" of Fig. 3.

Fig. 5 is a view taken on the line "5—5" of Fig. 3.

Fig. 6 is an enlarged fragmentary view taken on the line "6—6" of Fig. 5.

Fig. 7 is an enlarged section taken on "7—7" of Fig. 5.

Referring to the drawings and particularly to Fig. 1 which illustrates diagrammatically a system for dewaxing hydrocarbon wax bearing oils including in combination the present invention:

A suitable pump 12 is provided to withdraw wax bearing oil from a storage tank 11 and deliver it through a pipe 14 into a chilling coil 13. The chilled oil emerging from the coil 13 is conducted through a pipe 15 into a mixing tank 16 where it is thoroughly mixed with diatomaceous earth or filter aid which is fed from a tank 18 through a pipe 19 having a control valve 20. A stirring device 17 which may be driven either mechanically or manually is suitably mounted in the tank 16.

Thus the chilled oil and filter aid delivered to the mixing chamber 16 are thoroughly mixed and go to form a body or reservoir of the mixture therein.

A pump 22, preferably of the rotary type, withdraws the mixture from the reservoir in the tank 16 through a pipe 21a and delivers it in a substantially constant stream through a pipe 21b into a filter press 23a containing a number of filter elements 23b. A portion of the oil in the mixture is forced through the filter elements 23b and discharged from the system by means of a pipe 24 into a storage tank 25.

As has been previously mentioned the mixture is preferably delivered to the filter press at such a rate that a portion of the mixture is passed or circulated through the filter chamber or filter press 23 and returned to the mixing chamber 16 in order to set up sufficient turbulence or agitation of the body of mixture in the filter press 23a to thereby maintain an evenly distributed suspension of the filter aid. This portion is returned to the reservoir in the tank 16 through the pipe 28 having an interposed control valve 29 regulated by an automatic regulator 30.

It is to be understood that in the beginning of a cycle the operation is carried on under little or no pressure and that the pump 22 delivers a substantially constant stream of the mixture to the filter 23a a portion of the oil of which is forced through the filter elements 23b and discharged while a portion of the mixture is continuously returned to the reservoir 16. Almost immediately however a cake of the solid material begins to gather on the surfaces of the filter elements which, as it continues to grow thicker, causes an increasing amount of resistance against the flow of the filtrate therethrough. It has been found, that in order to maintain the most valuable operating condition, it is proper to maintain a substantially constant flow of oil through the filter elements while maintaining a substantially constant stream of mixture circulating i. e. passing back from the filter chamber to the mixture reservoir. Accordingly at the beginning of a cycle the automatic regulator 30 is set in motion with the regulated control valve 29 open and the valve is gradually closed thus causing a gradual increase in the amount of resistance to the return of the portion of mixture returned to the reservoir. The closing of the control valve 29 is regulated through the automatic regulator 30 to correspond to the amount of resistance against the discharge of the filtrate through the filter elements.

A line 21c extending from the discharge line 21b to the suction line 21a is provided having a relief valve 21d which is set to relieve back to the suction line at a pressure slightly above a predetermined maximum working pressure i. e. slightly above 250# per square inch in the present instance.

Referring now to Fig. 2 of the drawings which illustrates the regulator 30 in detail and its relation to the valve 29; an electric motor 50 of appropriate size, say ¼ horse power having a speed of say 1150 R. P. M., acts through a set of speed reducing gears 51 to rotate a pinion 52 and a cam 70 rigidly mounted on a shaft 51a at the rate of about 3 R. P. M. A spur gear 53 rigidly mounted on a shaft 54 and a pinion 55 also rigidly mounted on the shaft 54, which is supported by appropriate pedestal bearings 54a and 54b, are rotated by the direct action of the rotating pinion 52 upon the gear 53.

A spur gear 56 rigidly mounted on a shaft 57 is rotated at the rate of say 1 revolution in 45 minutes by the pinion 55, and serves, through the shaft 56, to rotate a cam wheel 58 having truncated cam elements 58a which are adjustable as to their annular position upon the cam wheel. The cam wheel is provided with an appropriate clutch 58c which rigidly engages the cam wheel with the shaft 57 during a cycle and which may serve to disengage the cam wheel from the shaft 57 during a down period or just before beginning a new cycle.

The cam wheel 58 is provided with two annular slots or grooves having enlarged base portions, one slot on each side of its rim near the periphery. The adjustable cam elements 58a are each secured by a bolt 58b the head of which fits slidably into the enlarged base portion of either of the grooves. The grooves are provided with suitable openings for inserting the bolt heads after which the bolts may be moved around in the grooves to any desired position around the circle where they may be secured by merely taking up on the nuts. The cam elements are truncated or beveled at their outer ends so that a cooperating roller may be engaged for a very brief space of time, and the cam elements situated on opposite sides of the wheel are staggered so as to form an unbroken track for the cooperating roller to roll upon when it is desirable to keep the roller engaged for the space of several cam elements.

A ratchet wheel 59 having a chain sprocket wheel 60 attached thereto are both loosely mounted on the shaft 57 which is suitably supported by pedestal bearings 57a and 57b.

A loop of appropriate chain 61 cooperating with the sprocket wheel 60 and a sprocket wheel 62 rigidly mounted on a rotatable stem 63 of the control valve 29 serves to establish a working relation between the sprocket wheels 60 and 62.

A roller 71 loosely mounted on a pin 71a secured on the side near the upper end of an arm 72, rests upon or rather rolls upon the cam 70 which has two cam elements integral therewith. As the shaft 51a rotates at a speed of 3 R. P. M. the cam 70 imparts 6 impulses per minute to the arm 72 through the cooperating roller 71. The lower end of the arm 72 is rigidly mounted on a shaft 72a. Another arm 72b, set at an angle to the arm 72 is also rigidly mounted on the shaft 72a, and accordingly receives therethrough 6 impulses per minute. The shaft 72a is supported by the pedestal bearings 73a and 73b. Thus the two arms 72 and 72b by the aid of the shaft 72a serve to act as a crank, receiving 6 impulses per minute. A substantially horizontal pawl 74 is loosely secured on its side near its outer end to the side near the lower end of the crank arm 72b by means of a pin 72c and, by the crank arm 72b, is moved back and forth in a substantially horizontal line thus rotating the ratchet wheel 59, on occasions, tooth by tooth.

The securing pin 72c also serves as a fulcrum for the pawl 74 which, through the action of other parts as will be immediately explained, may be engaged or disengaged from the ratchet wheel 59, for there will be occasions during the cycle, while other parts of the mechanism continue to operate, when it is desirable to rotate the ratchet wheel and occasions when it is desirable not to rotate the ratchet wheel.

As has been previously mentioned the cam wheel 58 is provided with a number of cam elements 58a which are appropriately spaced around the grooves in the cam wheel where they are secured by the bolts 58b. Now as the cam wheel is slowly rotated the cam elements 58a are brought into contact with a roller 80 as it rolls upon the face of the cam wheel and accordingly the roller is lifted or forced outwardly from the face of the cam wheel 58 to roll upon the cam elements 58a, and as the cam elements pass from under the roller it is returned to again roll upon the face of the cam wheel, etc. The roller 80 is mounted on a pin 81 which is secured to a side of the upper arm of a bell crank 82. The bell crank 82 is loosely mounted at its fulcrum point on the shaft 72a and its lower or outstanding arm is loosely secured to a pin 83a on a swivel 83 which is slidably mounted on a rod 84. The rod 84 is in a substantially vertical position and has a helical spring 85, fairly well compressed, around its upper portion extending from the under side of the swivel 83 to a collar 84a, and a pair of lock nuts 86a and 86b screwed on its upper threaded end. The lower end of the rod 84 is slightly enlarged and is loosely secured to the outer end of the pawl 74 by a pin 87. Thus when the rod 84 and the parts enumerated in connection therewith are assembled they will serve to act as a click element for the pawl 74 when they are acted upon by the bell crank 82 having the roller 80 which cooperates with the cam elements 58a on the cam wheel 58.

Thus it is to be seen that as the roller 80 mounted on the pin 81 in the upper arm of the bell crank 82 rolls up on one or more of the cams 58a the lower arm of the bell crank moves downward tending to further compress the spring 85 thus forcing the rod 84 downward causing a depression of the outer end of the pawl which rocks the inner or latch end of the pawl into a cooperating relation with the ratchet wheel 59.

Now, as previously mentioned, the pawl 74 is moved back and forth horizontally by the crank arms 72 and 72b and, on occasions when the pawl is engaged with the ratchet wheel, rotates the ratchet wheel tooth by tooth i. e. for each reciprocating movement of the pawl the ratchet wheel is rotated the space of one tooth. In the present embodiment of the invention the ratchet wheel rotates in a clockwise direction as viewed in Fig. 4.

As the ratchet wheel 58 is rotated the sprocket wheel 60, attached thereto, is also rotated which causes a corresponding movement of the chain 61, and the chain acting in turn upon the sprocket wheel 62 rigidly mounted on the valve stem 63 gradually closes the valve.

As has been previously mentioned the shaft 57 and the parts rigidly mounted thereon, including the cam wheel 58 having the clutch 58c, rotate at a speed of one revolution in 45 minutes. Now the cam elements 58a which are movable in the grooves of the cam wheel 58, may of course be located as desired around the cam wheel or there may be a sufficient number of them to form an unbroken track for the roller 80 to roll upon. The latter condition would obtain unbroken engagement of the pawl with the ratchet wheel 59 and correspondingly the sprocket wheel 60 would be rotated uninterruptedly, which would serve to close the valve 29 in the shortest order thus limiting the duration of a cycle to the minimum. On the other hand the number of cams may be so limited and so located as to form a broken track of regular or irregular intervals and/or groups of cam elements so as to obtain any desired order of action of the pawl upon the ratchet wheel 59 etc. which would serve to close the valve gradually or by stages in a predetermined manner.

For example a sufficient number of the cam elements 58a may be employed to form an unbroken track for the roller 80 and the pawl would accordingly be engaged continuously with the ratchet wheel 59 which in the present embodiment has 90 teeth. Now as the cam 70 indirectly causes 6 reciprocating movements per minute of the pawl 74 there would be six resulting movements of the ratchet wheel 59 of the space of one tooth each, consequently the ratchet wheel would make one complete revolution in fifteen minutes. Assuming that three revolutions of the valve stem 63, when the valve 29 is fully open, will close the valve and that the chain sprockets 60 and 62 have the same number of teeth, it is to be seen that 45 minutes will be required in which to close the valve 29, and is therefore the duration of one cycle under the conditions mentioned. The duration of a cycle may be further shortened if desired by using a ratchet wheel with fewer teeth or by increasing the size of the sprocket wheel 60 over the sprocket wheel 62 or by employing a valve requiring fewer revolutions of the wheel for closing while on the other hand the duration of a cycle may be lengthened preferably by employing fewer cam elements in the cam wheel 58 and adjusting them according to the desired order of manipulation of the valve 29. It will be apparent that each cycle is preferably completed in slightly less than one revolution of the cam wheel 58.

An automatic feature is provided for severing the relation between the mechanism and the valve when the valve is closed. The automatic feature accomplishes this by disengaging the pawl 74 from the ratchet wheel 60 if it is engaged therewith or by preventing the pawl from becoming engaged with the ratchet wheel if it is disengaged therefrom.

A pin 100 secured to the rim of the cam wheel 58, near its periphery, depresses a trigger 101 pivotally secured to a pedestal support 102 by a pin 103, thus releasing a lever 104 which is drawn downward immediately by a taut helical spring 106. The lever 104 is rigidly mounted on a shaft 105 which is supported by a suitable pedestal bearing 102. As the shaft 105 is partially rotated by the downwardly moving lever 104 it swings a crank arm 107 (whose upper end is rigidly secured to the shaft 105, having a roller 108 loosely mounted on a pin 109 which is secured to the lower end of the crank arm 107, and the roller 108 thereupon engages with the inner or latch end of the pawl 74 to either move it downwardly, in case the pawl is being acted upon by the click element, to disengage it from the ratchet wheel 60 or merely hold it down, in case the pawl is not being acted upon by the click element, to prevent it from becoming engaged with the ratchet wheel.

It is thus to be seen that the mechanism may be adjusted so that immediately the valve 29 is fully closed the mechanism will cease to function with relation to the valve and the power may be switched off manually to stop the motor and the pump 22. The filter press 23 may then be opened and the collection or cake of material on the surfaces of the filter elements 23a may be dislodged and discharged through the line 26 to the storage 27, and the equipment otherwise attended to in preparation for starting a new cycle.

Following cleaning and other preparation for a new run, with other portions of the system and apparatus being in readiness to begin another cycle, the clutch feature 58c on the cam wheel 58 is released and the cam wheel rotated, if necessary, until the pin 100 just clears the trigger 101 in a clockwise direction. The lever 104 is then raised manually, the latch on the trigger being held against the rounded end of the lever 104 by the spring 106, until the trigger latch engages with a notch on the rounded end of the lever where it will remain normally until tripped by the pin 100 upon the completion of the next cycle.

It will be apparent that the present invention may be employed in a number of different ways, for example, the valve 29 may be opened gradually instead of closed, or only the timed, automatically governed, operating portion of the mechanism, to the exclusion of the valve, itself, may be employed for other purposes where a device of such a nature might serve to dispense with a certain amount of labor as well as to accurately regulate the time of an operation.

It is obvious that the present embodiment of the invention may be modified in various ways without affecting the spirit and scope of the invention and it is desired that it be limited only by the following claims.

I claim:

1. Timed regulating mechanism comprising an electric motor, gear systems, a rotated cam wheel having adjustable cam elements, a bell crank cooperating with the cam wheel, a rotatable ratchet wheel having a chain sprocket wheel attached thereto, a loop of chain linking the sprocket wheel and a chain sprocket wheel rigidly attached to a device to be regulated, a cam, a crank system cooperating with the cam, a pawl engaging with the ratchet wheel and rotating the ratchet wheel and the attached sprocket wheel when acted upon by the cam elements on the cam wheel thru the cooperating bell crank and the cam thru the cooperating crank system simultaneously to regulate the device thru the resulting action of the first said sprocket wheel upon the loop of chain and its corresponding action upon the sprocket wheel attached to the device.

2. A mechanical regulating device comprising a prime mover, a cam wheel, reduction gearing between the prime mover and the cam wheel, a second cam cooperating with said reduction gearing, a ratchet wheel, means for transmitting movement from said ratchet wheel to the device to be regulated, a pawl actuated by said second mentioned cam for engaging said ratchet wheel to cause rotation thereof and means actuated by said cam wheel for moving said pawl into operative position to engage said ratchet wheel.

3. An automatic regulator for operating a control valve comprising a prime mover, a cam wheel, reduction gearing between the prime mover and the cam wheel, a second cam cooperating with said reduction gearing, a ratchet wheel, means for transmitting movement from said ratchet wheel to the valve device to be regulated, a pawl actuated by said second mentioned cam for engaging said ratchet wheel to cause rotation thereof, means actuated by said cam wheel for moving said pawl into operative position to engage said ratchet wheel and means actuated by said cam wheel for automatically disengaging said pawl from said ratchet wheel when said control valve has received the desired adjustment.

4. An automatic regulator comprising a prime mover, a cam wheel having adjustable cam elements, gear systems, a second cam cooperating with said gear systems, a ratchet wheel, means for transmitting movement from said ratchet wheel to the device to be regulated, a pawl for engaging said ratchet wheel, connections for transmitting movements of said second mentioned cam to said pawl, a bell crank cooperating with said cam wheel for moving said pawl into operative position with said ratchet wheel and means including a spur on said cam wheel for operating a trigger and lever whereby said pawl may be automatically disengaged from said ratchet wheel when said cam wheel reaches a predetermined position.

In witness whereof I have hereunto set my hand this 4th day of February, 1929.

ANDREW T. DUDLEY.